United States Patent
Nakajima et al.

(10) Patent No.: US 6,417,876 B1
(45) Date of Patent: Jul. 9, 2002

(54) APPARATUS AND METHOD FOR FORMING IMAGE WITH HIGH IMAGE RESOLUTION FROM IMAGES HAVING VARIOUS DOT DENSITIES

(75) Inventors: Yoshinori Nakajima, Joyo; Tetsuro Toyoshima, Soraku-gun; Tadashi Iwamatsu, Nara; Nobuyuki Azuma, Ibarakai; Yoshinori Mutou, Kitakatsuragi-gun, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/590,639

(22) Filed: Jun. 8, 2000

(30) Foreign Application Priority Data

Jun. 9, 1999 (JP) ............................................. 11-162216

(51) Int. Cl.[7] ........................ G03G 15/00; G03G 15/04; H04N 1/04
(52) U.S. Cl. ........................ 347/131; 347/132; 347/133; 358/295; 358/300; 382/209
(58) Field of Search ................................. 347/129, 131, 347/132, 133, 251, 252, 253, 254, 240; 358/1.2, 1.9, 298, 300; 382/209

(56) References Cited

U.S. PATENT DOCUMENTS

| | | | | |
|---|---|---|---|---|
| 4,681,424 A | * | 7/1987 | Kantor et al. | 347/129 |
| 4,847,641 A | * | 7/1989 | Tung | 347/131 |
| 5,270,827 A | * | 12/1993 | Kobayashi et al. | 358/298 |
| 5,412,408 A | | 5/1995 | Itoh et al. | 347/132 |
| 5,493,324 A | * | 2/1996 | Goto et al. | 347/252 |
| 5,687,297 A | * | 11/1997 | Coonan et al. | 395/1.2 |
| 5,754,751 A | * | 5/1998 | Smith et al. | 395/1.9 |
| 5,946,021 A | * | 8/1999 | Kawata | 347/237 |

FOREIGN PATENT DOCUMENTS

| | | | |
|---|---|---|---|
| JP | 63-64763 | | 3/1988 |
| JP | 63-296069 | | 12/1988 |
| JP | 5-16533 | | 1/1993 |
| JP | 8-95433 | | 4/1996 |
| JP | 10-133516 | * | 5/1998 |
| JP | 11-15214 | | 1/1999 |
| JP | 2893133 | | 3/1999 |

* cited by examiner

Primary Examiner—Joan Pendegrass
(74) Attorney, Agent, or Firm—Dike, Bronstein, Roberts & Cushman - IP Group; David G. Conlin; George W. Hartnell, III

(57) ABSTRACT

A control unit of an image forming apparatus for controlling exposure energy includes a reference image storage unit storing a plurality of reference images, an image recognition unit comparing image information consisting of a plurality of pieces of pixel information with data stored in the reference image storage unit, an exposure energy density storage unit storing an exposure energy density for each reference image stored in the reference image storage unit, an exposure energy density determination unit based on data from the image recognition unit and data in the exposure energy density storage unit an exposure energy density to be applied to a dot position corresponding to each piece of the pixel information, and a laser drive driving a laser of an exposure unit based on data from the exposure energy density determination uni. Accordingly, the image forming apparatus can be provided which exhibits an excellent image reproducibility for images with various dot densities.

8 Claims, 10 Drawing Sheets

F I G. 2
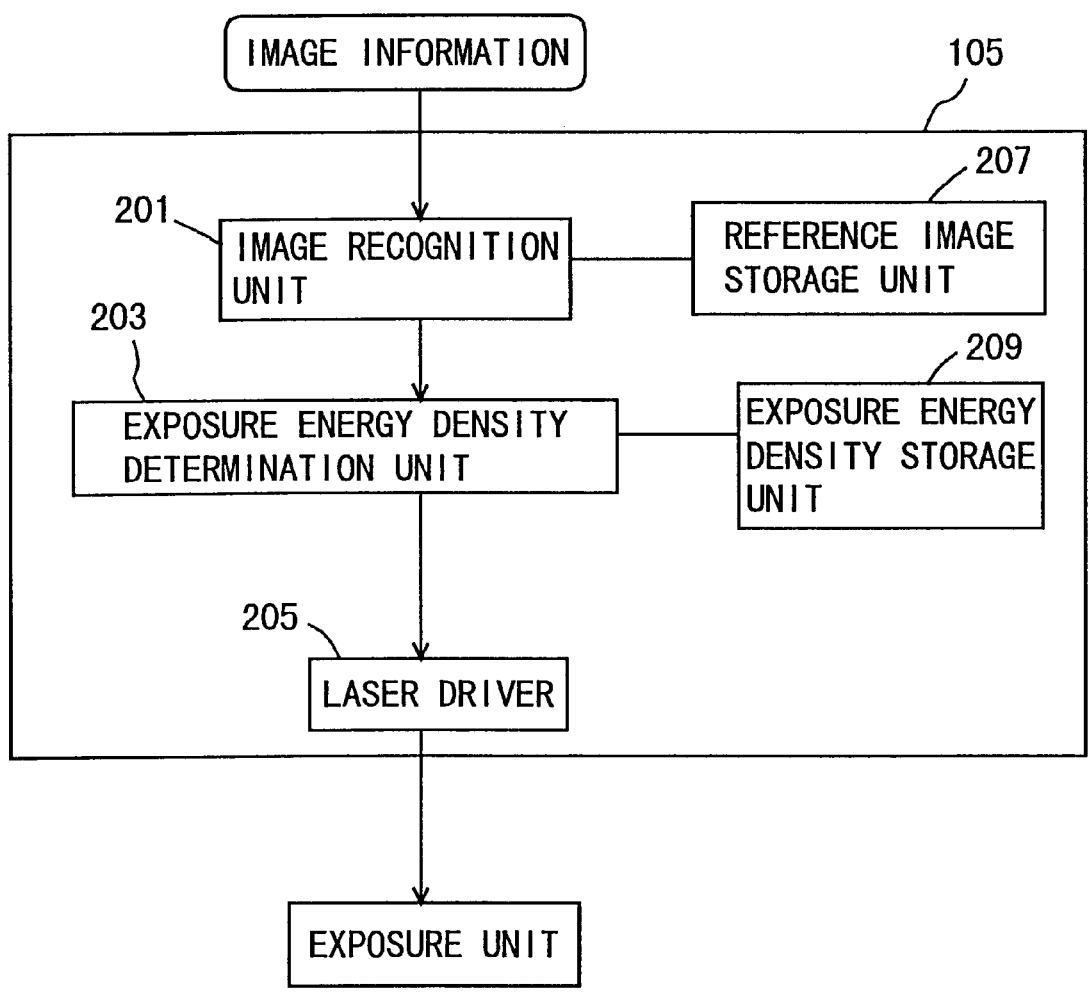

20μm(1200dpi)
40μm(600dpi)

FIG. 4

| REFERENCE IMAGE | IMAGE PATTERN | EXPOSURE ENERGY DENSITY ($\mu J/cm^2$) |
|---|---|---|
| ONE ISOLATED DOT | a | 0.30 |
| ... | | |
| ONE BY ONE DOT | e | 0.28 |
| ... | | |
| MONO-LINE | b | 0.23 |
| PERIODIC LINE | c | 0.20 |
| ... | | |
| OBLIQUE LINE | d | 0.35 |
| ... | | |

|   | 1 | 2 | 3 | 4 | 5 | 6 | 7 | 8 | 9 | 10 |
|---|---|---|---|---|---|---|---|---|---|---|
| A | 0.23 | 0.20 | 0.20 | 0.20 | 0.23 | 0 | 0 | 0 | 0 | 0 |
| B | 0 | 0 | 0 | 0 | 0 | 0 | 0 | 0 | 0 | 0 |
| C | 0.23 | 0.20 | 0.20 | 0.2 | 0.23 | 0 | 0 | 0.30 | 0 | 0 |
| D | 0 | 0 | 0 | 0 | 0 | 0 | 0 | 0 | 0 | 0 |
| E | 0.23 | 0.20 | 0.20 | 0.20 | 0.23 | 0 | 0 | 0 | 0 | 0 |

|   | 11 | 12 | 13 | 14 | 15 | 16 | 17 | 18 | 19 | 20 |
|---|---|---|---|---|---|---|---|---|---|---|
| A | 0 | 0 | 0 | 0 | 0 | 0.3 | 0 | 0.28 | 0 | 0.30 |
| B | 0 | 0 | 0 | 0 | 0 | 0 | 0 | 0 | 0 | 0 |
| C | 0 | 0 | 0.2 | 0.2 | 0.23 | 0.2 | 0 | 0.28 | 0 | 0.28 |
| D | 0 | 0 | 0 | 0 | 0 | 0 | 0 | 0 | 0 | 0 |
| E | 0 | 0 | 0 | 0 | 0 | 0.3 | 0 | 0.28 | 0 | 0.30 |

UNIT ($\mu J/cm^2$)

APPARATUS AND METHOD FOR FORMING IMAGE WITH HIGH IMAGE RESOLUTION FROM IMAGES HAVING VARIOUS DOT DENSITIES

BACKGROUND OF THE INVENTION

1. Field of the Invention

The present invention relates to image forming apparatuses and methods for forming an image based on a digital image. In particular, the invention relates to an image forming apparatus and an image forming method, for forming a high-quality image by controlling exposure energy density.

2. Description of the Background Art

With the advent of an age of digital information, demand is growing for printers, facsimiles, copiers and the like that are based on digital processing system. There is also a growing demand on these image forming apparatuses for enhanced image quality. Especially, development of copiers and printers is requested these days that are superior in reproducibility which enables high-definition images of various document fonts or photo level to be reproduced accurately.

However, it has been known the reproducibility varies depending on the type of images (difference of dot density) even if the condition of exposure is unchanged. A problem then arises that it is difficult to maintain a superior reproducibility for various images.

For example, suppose that the resolution of a line pattern consisting of lines on every second lines (hereinafter referred to as "periodic line pattern") is ensured. Then, the diameter of a dot included in a one-dot pattern consisting of nonadjacent dots with a low dot density (hereinafter referred to as "isolated dot pattern") would be smaller than a desired value, or the dot itself would not be formed in some cases. On the contrary, if the dot diameter of the isolated dot pattern is ensured, the width of a line of the line pattern would be greater than a desired value, or the lines disappear resulting in solid black image.

This phenomenon is now described in conjunction with the drawings. FIG. 6 illustrates one example of digital image information. Here, the reference characters A to G and numerals 1 to 20 are applied for indicating dot positions.

Referring to FIG. 6, a virtual pattern in a memory space is shown consisting of rows (A, B, C, . . . ) and columns (1, 2, 3, . . . ). For example, the black portions represented by (row, column)=(A, 1) and the like mean "print" (voltage level is high), while white portions represented by (row, column)=(B. 1) and the like mean "non-print" (voltage level is low).

If data is read in one-dimensional manner from the memory storing the image information shown in FIG. 6 and a semiconductor laser is driven based on the read data, the laser is turned on (driven) when the read data is "pint" (voltage level is high) and the laser is not turned on (driven) when the read data is "non-print" (voltage level is low).

Specifically, "A" is first designated as a row address which is one of signals input to the memory and then "1, 2, 3, . . ." are designated in this order as a column address which is another input signal. Accordingly, row data in row A thus designated are successively read and a laser driver which receives the data controls turning on/off of the laser. In this way, an electrostatic latent image according to the image information regarding row A is formed on a photoreceptor.

Next, "B" is designated as a row address and "1, 2, 3, . . ." are successively designated as a column address. Then, the designated data regarding row B are also read and the laser driver controls turning on/off of the laser according to the data. An electrostatic latent image is thus formed based on the image information for row B as done for row A.

This operation is repeated to form on the photoreceptor a two-dimensional electrostatic latent image pattern corresponding to the image pattern shown in FIG. 6.

Figures 11, 12:
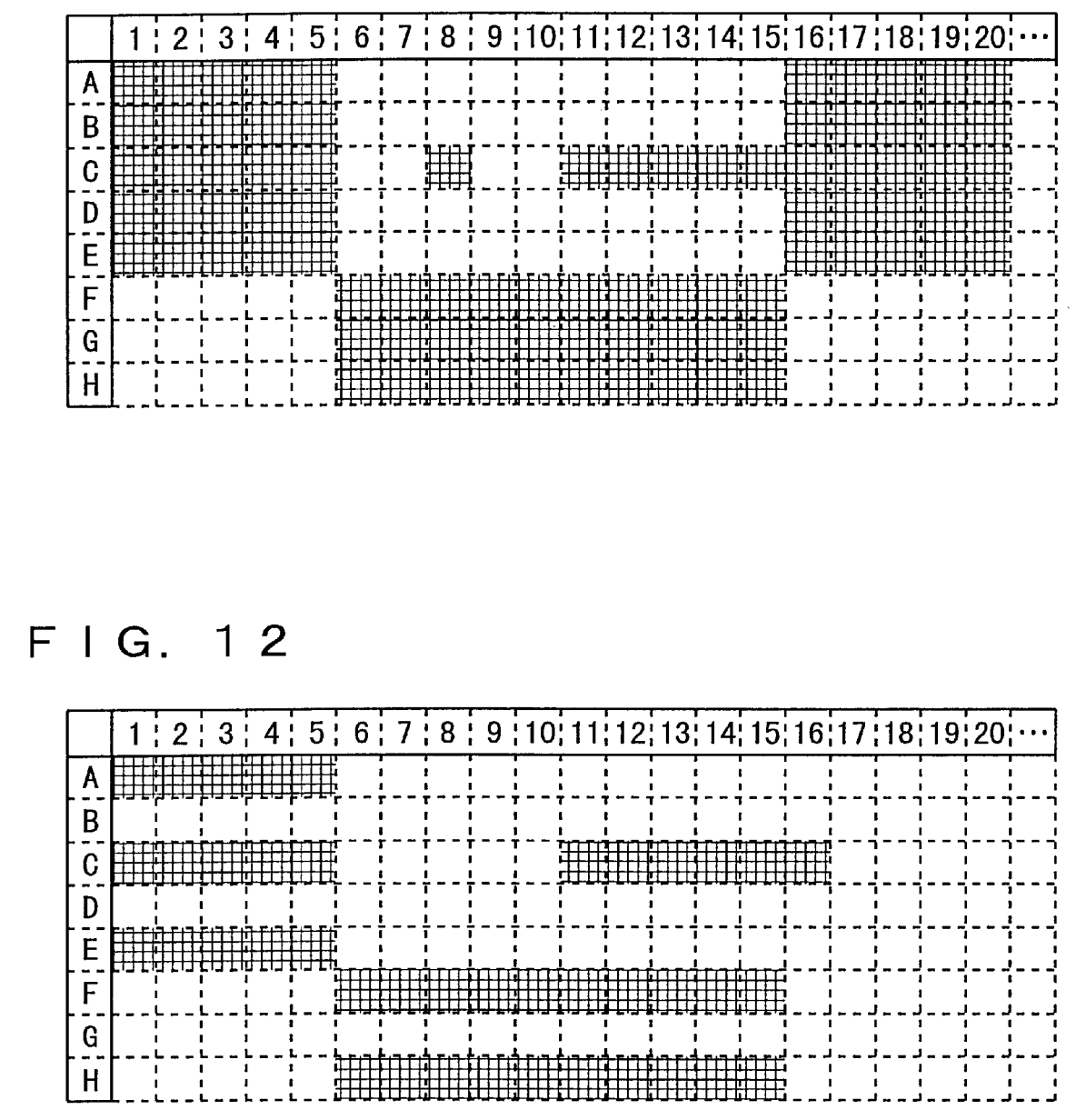

FIGS. 11 and 12 respectively illustrate extreme results of development obtained by performing such a process of forming an electrostatic latent image for each of all image patterns shown in FIG. 6 under the same exposure condition.

FIG. 12 shows a result obtained by forming an image under an exposure condition which enhances the reproducibility of the line pattern of the original image (FIG. 6). Under this exposure condition, the line pattern is properly reproduced as shown in FIG. 12 while the reproducibility of the isolated dot pattern is deteriorated. In an extreme case, the isolated dot disappears or the dot is not reproduced at all.

FIG. 11 shows a result obtained by forming an image under an exposure condition which ensures the dot diameter of the isolated dot pattern of the original image (FIG. 6). Under this exposure condition, the isolated dot is appropriately reproduced with a desired dot diameter as shown in FIG. 11 while the reproducibility of the line pattern is impaired. In an extreme case, the line width increases to cause non-print portions to disappear, resulting in a solid black image.

In order to solve this problem that a superior reproducibility cannot be ensured for images having different dot densities, Japanese Patent Laying-Open No. 63-64763 discloses a method according to which print data itself is corrected (related art 1). Specifically, an isolated one-dot print data is detected from print data, and one bit preceding or following the detected one-dot print data is corrected as print data.

Japanese Patent Laying-Open No. 63-296069 discloses a method for solving that problem by changing the diameter of a beam spot on the photoreceptor (related art 2). Specifically, an isolated one-dot print data is detected from print data, and the diameter of a beam spot for the detected one-dot print data is increased.

This problem that a superior reproducibility cannot be ensured for images having different dot densities should be considered together with an influence of change in the film thickness of the photoreceptor as time progresses. Reproducibility of an image is considerably affected by charging and light attenuation characteristics of the photoreceptor as well as modulation transfer function of electric field within the photoreceptor, and the like. These characteristics of the photoreceptor vary depending on the film thickness of the photoreceptor, The film thickness of the photoreceptor decreases with time due to contact with a cleaning member for removing residual toner, friction with a paper for transfer, and the like. Therefore, the various characteristics of the photoreceptor change with time merely by using the image forming apparatus.

A problem then arises that the density of a black portion of a printed image or the brightness of the image changes from the initial setting, or the reproducibility of images having different dot densities cannot be maintained.

Various image formation techniques have been proposed in order to overcome this problem, considering the change with time in the film thickness of the photoreceptor. As representative approaches, Japanese Patent Laying-Open No. 8-95433 discloses a technique of ensuring the brightness of an image by sensing change in the film thickness of the photoreceptor to control the amount of exposure lamp (related art 3), Japanese Patent Laying-Open No. 5-16533 discloses a technique of ensuring the density by measuring the optical density of a reference patch image formed on the photoreceptor to feed back the result of the measurement (related art 4), and Japanese Patent Laying-Open No. 11-15214 discloses a technique of controlling the charging potential of the photoreceptor and controlling the development bias potential in consideration of variation in the image density due to change in the development electric field caused by change with time in the photoreceptor characteristics (related art 5).

However, with the higher image resolution, it is more difficult to ensure a superior reproducibility for images having different dot densities. If an image having a resolution of 1200 dpi is to be formed by using a practically employed photoreceptor with a film thickness of 20 $\mu$m to 30 $\mu$m, for example, a superior reproducibility for images with different densities cannot be ensured by the techniques discussed above.

When the same exposure energy density is used to form images with a low dot density and with a relatively high dot density respectively, respective latent images formed on the photoreceptor are different from each other in the latent image potentials of print portions and non-print portions.

Specifically, the image having a high dot density has a portion on the photoreceptor where exposure lights overlap. Therefore, on a negatively charged photoreceptor, for example, the portion where exposure lights overlap has a potential which is greater than a normal potential by the extra exposure energy. In other words, the effect of overlapping potential is observed.

This overlapping effect can be reduced by optimizing the exposure spot diameter as disclosed in related art 2 if resolution is low. However, if the resolution is high, there are more portions where the overlapping effect occurs, and thus it is impossible to weaken the overlapping effect just by changing the exposure spot diameter.

Even if the technique of changing the contents of original print data is used as disclosed in related art 1, the original image could not be reproduced precisely. Therefore, related art 1 cannot fundamentally solve this problem.

Related arts 3 to 5 disclose solutions for the variation in the density and the brightness of an image caused by the change with time in the film thickness of the photoreceptor. However, any solution cannot ensure the reproducibility of image patterns having different dot densities.

Accordingly, even if the exposure unit is controlled only in consideration with the influence of change in the film thickness of the photoreceptor, an output image cannot be formed which is truly superior in the reproducibility.

SUMMARY OF THE INVENTION

One object of the present invention is to provide an image forming apparatus and a method of forming an image which can provide a superior image reproducibility for images having various dot densities.

Another object of the invention id to provide an image forming apparatus and a method of forming an image which can ensure an image reproducibility over a long period of time for images having various dot densities even if the film thickness of a photoreceptor changes.

Those objects of the invention are achieved by an image forming apparatus including following elements. Specifically, according to one aspect of the invention, the image forming apparatus includes an exposure unit for exposing a photoreceptor which is charged to a predetermined potential to light, a control unit for controlling exposure energy density of the exposure unit based on image information, and a development unit for visualizing an electrostatic latent image formed on the photoreceptor by the exposure unit. The control unit includes a first storage unit storing a plurality of reference images, a comparison unit comparing the image information with a reference image, and a first determination unit determining an exposure energy density corresponding to each of a plurality of pieces of pixel information constituting the image information based on result of the comparison by the comparison unit.

According to the present invention, an image forming apparatus can be provided which exhibits a superior image reproducibility for images with various dot densities.

Preferably, the control unit of the image forming apparatus further includes a second storage unit storing an exposure energy density corresponding to each reference image. The first determination unit includes a second determination unit which determines, based on result of the comparison by the comparison unit, an appropriate one of the plurality of reference images for each of the plurality of pieces of pixel information. Accordingly, an exposure energy density corresponding to each pixel information is determined based on the determined reference image and the stored exposure energy density.

The exposure energy density for each pixel information can thus be determined easily by referring to the second storage unit based on a reference image associated with each pixel information.

Still preferably, the comparison unit of the image forming apparatus includes an extraction unit extracting from the image information a matrix image formed of predetermined units for each pixel information, and a decision unit deciding whether or not the extracted matrix image matches a reference image. The second determination unit includes a first recognition unit which recognizes, if the extracted matrix image matches the reference image according to the decision by the decision unit, this reference image as an appropriate reference image.

In this way, if a matrix image matches a reference image, an optimum exposure energy density can immediately be determined for each pixel information.

Still preferably, the second determination unit includes a second recognition unit which recognizes, if the extracted matrix image does not match the reference image according to the decision by the decision unit, a reference image similar to the extracted matrix image as an appropriate reference image.

Accordingly, even if a matrix image does not match a reference image, a reference image similar to that matrix image is determined so as to eliminate the need for storing a large number of reference images.

Preferably, the image forming apparatus further includes a film thickness sensing unit sensing the film thickness of the photoreceptor. The first determination unit determines an exposure energy density corresponding to each pixel information in consideration of result of the sensing by the film thickness sensing unit.

Accordingly, an image forming apparatus can be provided which can ensure an image reproducibility for images with various dot densities over a long period of time even if the film thickness of the photoreceptor changes.

Preferably, the image forming apparatus further includes a film thickness sensing unit sensing the film thickness of the photoreceptor. The second storage unit stores an exposure energy density corresponding to each reference image in association with the film thickness of the photoreceptor, and the first determination unit determines an exposure energy density corresponding to each pixel information based on the determined reference image and the stored exposure energy density associated with the film thickness of the photoreceptor.

In this way, exposure energy density can easily be determined that is associated with the film thickness of the photoreceptor.

According to another aspect of the invention, a method of forming an image includes the steps of exposing a photoreceptor charged to a predetermined potential to light, controlling exposure energy density of an exposure unit based on image information, and developing an electrostatic latent image formed in the exposing step on the photoreceptor to visualize the latent image. The controlling step includes a first storage step of storing a plurality of reference images, a second storage step of storing an exposure energy density corresponding to each reference image, extracting from the image information a matrix image constituted of predetermined pixel units for each pixel information, deciding if the extracted matrix image matches any of the reference images, a first determination step of determining an appropriate one of the reference images for each of a plurality of pieces of pixel information constituting the image information based on result of the decision in the deciding step, and a second determination step of determining an exposure energy density corresponding to each pixel information based on a determined reference image and stored exposure energy density.

According to the present invention, it is possible to provide a method of forming an image exhibiting a superior image reproducibility for images with various dot densities.

Preferably, the image forming method further includes the step of sensing the film thickness of the photoreceptor. In the first storage step, an exposure energy density corresponding to each reference image is stored in association with the film thickness of the photoreceptor, and in the second determination step, an exposure energy density corresponding to each pixel information is determined based on a determined reference image and the exposure energy density stored in association with the film thickness of the photoreceptor.

In this way, it is possible to provide an image forming method ensuring an image reproducibility for images with various dot densities over a long period of time even if the film thickness of the photoreceptor varies.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a functional block diagram of a control unit of the image forming apparatus.

FIG. 4 illustrates as an example exposure energy densities for reference images stored in an exposure energy density storage unit.

FIG. 6 illustrates one example of digital image information.

FIG. 7 shows exposure energy density which is determined to be applied to each dot position by the control unit for the digital image information shown in FIG. 6.

FIG. 11 shows an image which is formed under an exposure condition to ensure a dot diameter of an isolated dot pattern in an original image (FIG. 6).

FIG. 12 shows an image which is formed under an exposure condition to enhance a reproducibility of a line pattern in the original image (FIG. 6).

DESCRIPTION OF THE PREFERRED EMBODIMENTS

Embodiments of the present invention are hereinafter described in conjunction with the drawings.

First Embodiment

Figure 1:
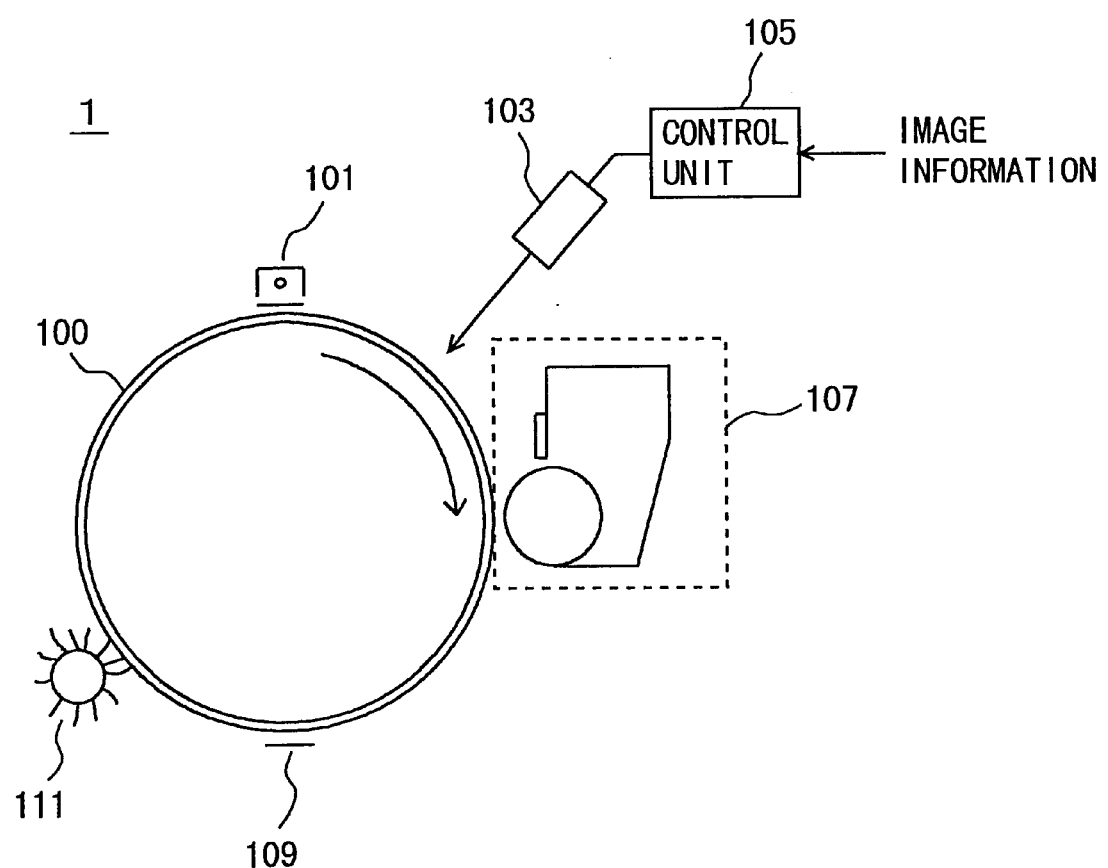
FIG. 1 illustrates a basic structure of an image forming apparatus according to one embodiment of the present invention.

Referring to FIG. 1, an image forming apparatus 1 includes a photoreceptor drum 100 having a photoconductive film, a reset unit 111 for cleaning photoreceptor drum 100, a charging unit 101 for uniformly charging the surface of photoreceptor drum 100, an exposure unit 103 for exposing the charged surface of photoreceptor drum 100 to light to form an electrostatic latent image, a control unit 105 for controlling exposure unit 103 based on image information, a development unit 107 for visualizing the electrostatic latent image formed on the surface of the photoreceptor drum 100 by using a developer (toner), a transfer unit 109 for transferring the toner image on the surface of photoreceptor drum 100 onto a piece of paper, and a fixing unit (not shown) for fixing the transferred toner image on the paper.

As photoreceptor drum 100, a laminated type organic photoreceptor drum is employed, for example, which is formed of an undercoat layer (UCL), a charge generation layer (CGL) and a charge transport layer (CTL) on a conductor substrate. The surface of the photoreceptor drum can be negatively charged.

A process of forming an image by image forming apparatus 1 is briefly described below. Charges on photoreceptor drum 100 are first cancelled by reset unit 111 for photoreceptor drum 100 by using a discharging lamp or the like. Simultaneously, unnecessary toner, paper powder and the like remaining on photoreceptor drum 100 are removed by a cleaning roller or the like.

Then, charging unit 101 uses a corona charger or a charging roller to charge the surface of photoreceptor drum 100 to a predetermined potential.

Next, laser beam emitted from a light source such as a semiconductor laser is directed onto the uniformly charged photoreceptor drum 100 in order to generate an electrostatic latent image. Exposure unit 103 is controlled by control unit 105 to modulate exposure energy density based on image information.

Development is then performed by development unit 107 so as to make visible the electrostatic latent image formed on the surface of photoreceptor drum 100 by using charged toner. It is noted that the method of development is not limited to dry development and wet development may be employed.

Transfer unit 109 then transfers a toner image formed on photoreceptor drum 100 onto a sheet of paper by using a transfer charger or the like.

After this, the fixing unit (not shown) applies heat and pressure to thermally fix toner onto the surface of the paper and accordingly printing (image formation) is completed.

FIG. 2 shows a functional block diagram of control unit 105 of image forming apparatus 1. Control unit 105 includes a reference image storage unit 207 storing a plurality of reference images, an image recognition unit 201 which compares input image information formed of a plurality of pieces of pixel information with data stored in reference image storage unit 207 to identify the input image information, an exposure energy density storage unit 209 storing exposure energy density corresponding to each reference image stored in reference image storage unit 207, an exposure energy density determination unit 203 determining exposure energy density to be applied to a dot position corresponding each pixel information, based on data supplied from image recognition unit 201 and data stored in exposure energy density storage unit 209, and a laser driver 205 driving a laser of exposure unit 103 based on data supplied from exposure energy density determination unit 203.

Reference image storage unit 207 stores a plurality of m×n (m, n=2p+1:p=1, 2, 3 . . . ) matrix images having different patterns, each matrix image consisting of dot regions as structural units corresponding to resolution of the image forming apparatus. This matrix image is a reference image.

Figure 3:
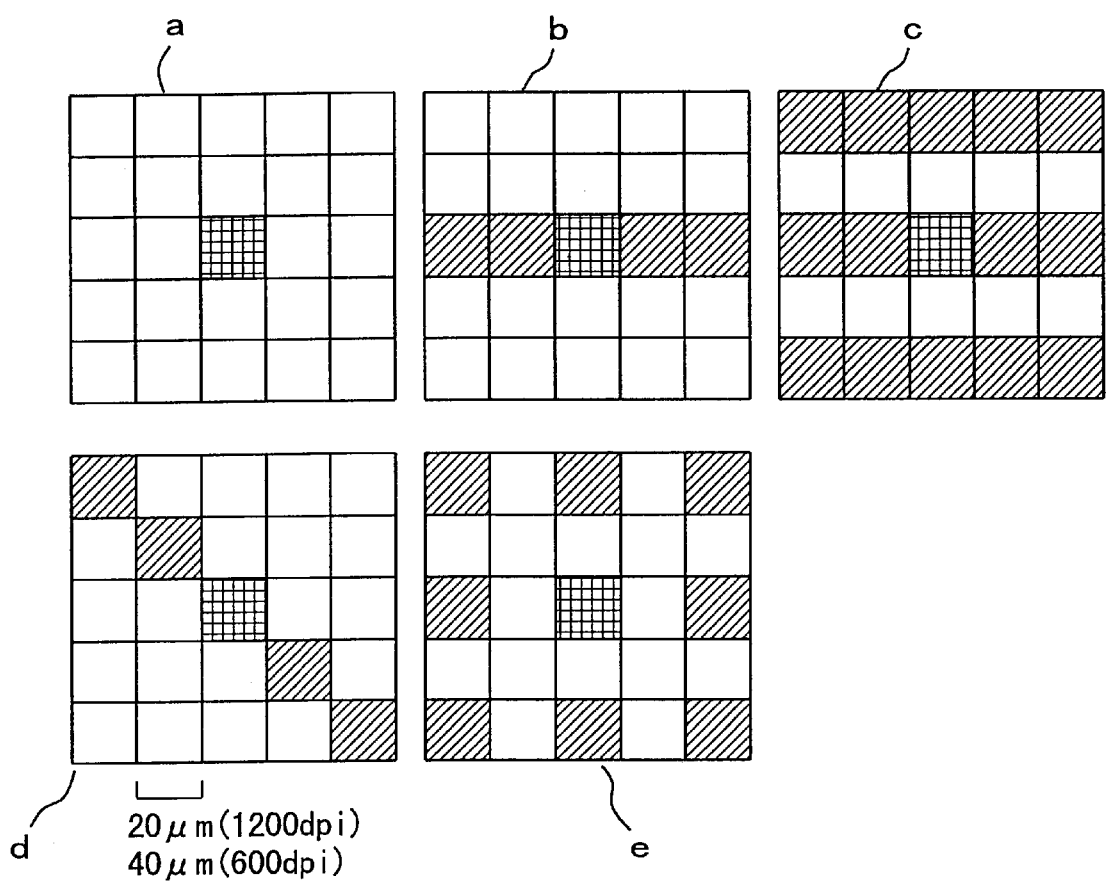
FIG. 3 illustrates as an example reference images stored in a reference image storage unit.

FIG. 3 shows reference images as an example stored in reference image storage unit 207. Referring to FIG. 3, a reference image here is a 5×5 matrix image and five patterns a to e thereof are shown as an example. A dot region which is a minimum structural unit is approximately 20×20 μm for resolution of 1200 dpi, and approximately 40×40 μm for resolution of 600 dpi, for example.

Data in a white region is "low" level, for example, so that an image after development is a white image. Data in a region represented by a lattice pattern and a hatched region are both "high" level, for example, so that respective images after development are both black images. It is noted that those regions are distinguished by the lattice and hatching for the purpose of convenience in order to tell a central dot to be noticed from other dots.

Exposure energy density storage unit 209 stores exposure energy density to be applied to the dot Qattice pattern) at the center of the reference image pattern shown in FIG. 3. This exposure energy density is associated with each reference image. The exposure energy density applied to the central dot of each reference image is determined in advance by an experiment or analysis.

FIG. 4 shows examples of the exposure energy density relative to reference images stored in exposure energy density storage unit 209. These values were determined through an experiment described below.

As an experiment apparatus, a basic experiment apparatus with a resolution of 600 dpi was employed formed of only charging, exposure and development process steps of the electrophotography process. Therefore, measurement and evaluation of an image were conducted by using a toner image formed on a photoreceptor drum, not by using an image transferred and fixed onto a sheet.

First in the charging step, a scorotron type charger was used to charge a sheet-like photoreceptor attached to a flat plate so that the charging potential of the photoreceptor in development was −800 V. Next in the exposure step, a semiconductor laser having a wavelength of 780 nm was driven by a laser driver (manufactured by KINO MELLES GRIOT CORPORATION), and its laser power and radiation time were adjusted to control exposure energy density at each dot position. In the development step, according to the mono-component contact development method, the bias of a development roller was set at −200 V. A laminated type phthalocyanine-based organic photoreceptor having a thickness of approximately 20 μm and negatively charged was used as the photoreceptor.

A toner is crushed by a jet crusher into particles, the particles were sorted, and particles having an average volume diameter of 5.5 μm were used, and the specific charge amount thereof was −40 to −50 ($\mu$C/g). An exposure spot having a diameter of 60 μm (1/$e^2$ diameter) was used.

Under these conditions, an image for the reference image pattern shown in FIG. 3 was formed on the photoreceptor while the exposure energy density was changed. An exposure energy density was then determined which caused a visualized image on the photoreceptor to have a desired image size, i.e. a dot diameter and a line width of 40 μm.

As a result, as shown in FIG. 4, the optimum exposure energy density varies depending on the difference of the dot density. It was observed that the optimum exposure energy density tended to be lower where there could be a higher possibility of occurrence of the potential overlapping effect. The exposure energy density for the reference pattern (din FIG. 3) having the oblique line pattern was high possibly because the oblique line having a great dot-dot distance must be continued with an optimum line width being maintained.

These numerical values vary depending on photoreceptor characteristics, development characteristics, exposure conditions and the like of an actually employed image forming apparatus. Therefore, values appropriate for respective conditions should be determined by such an experiment as herein conducted, numerical analysis or the like. The values thus determined are associated with respective reference images and stored as an LUT (look-up table) in a memory (exposure energy density storage unit 209).

Figure 5:
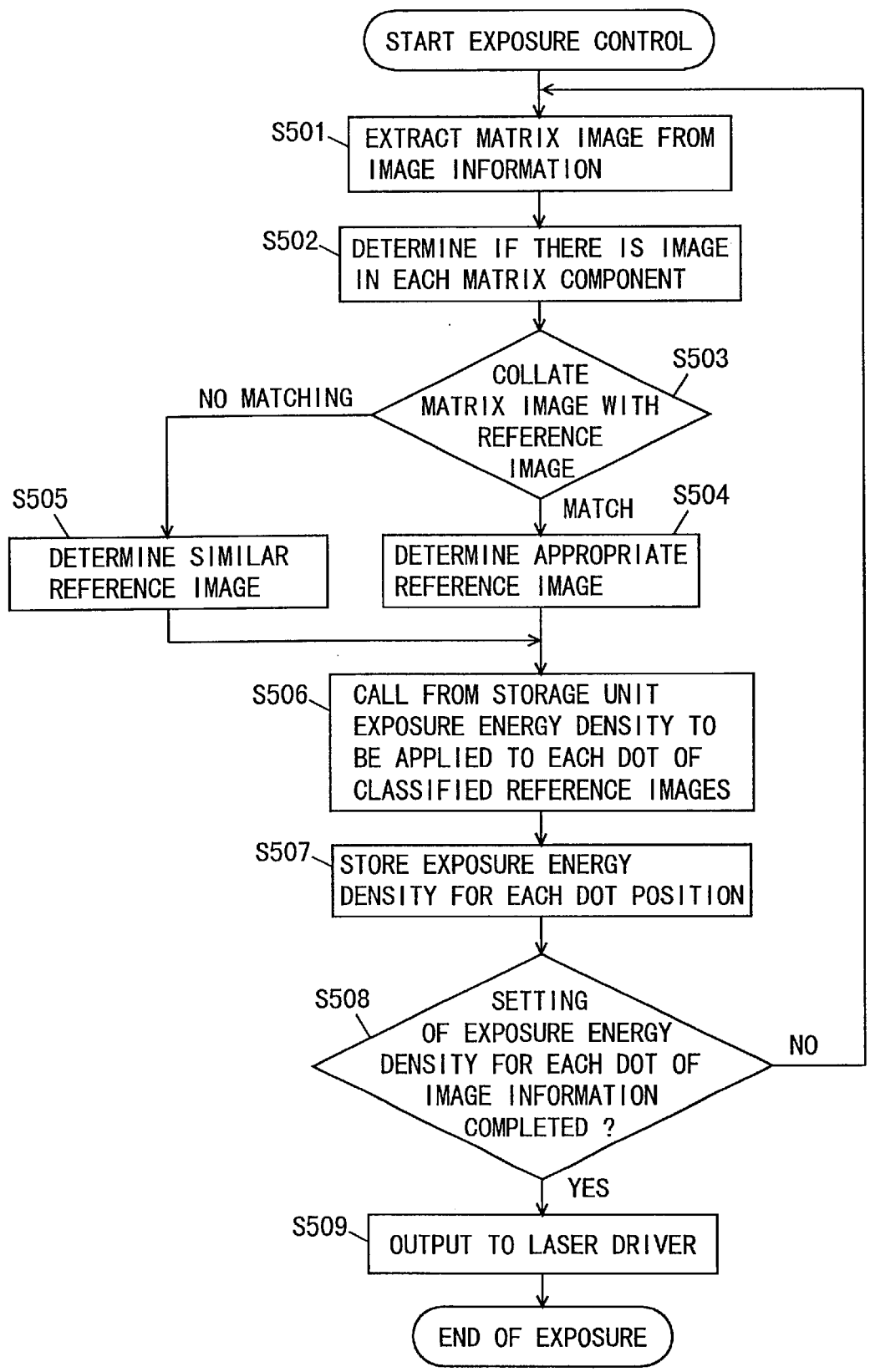
FIG. 5 is a flowchart illustrating a flow of controlling exposure energy density by the control unit of the image forming apparatus.

FIG. 5 is a flowchart illustrating a flow of controlling exposure energy density made by control unit 105 of image forming apparatus 1. It is noted that the digital image information shown in FIG. 6 is used as input image information for explaining details of processing.

Referring to FIG. 5, in step S501, a matrix image concerning noticed pixel information is extracted from input image information. Specifically, the digital image information consists of a plurality of pieces of pixel information. In order to determine exposure energy density to be applied to a dot position corresponding to each pixel information, a matrix image, regarding one noticed pixel, which has the same area as that of a reference image is extracted.

For example, if a reference image is a 5×5 matrix as shown in FIG. 3, a matrix image to be extracted is a matrix image of the same size, i.e., 5×5. The matrix image is extracted such that a noticed pixel (which exposure energy density is to be determined) is located at the center of the 5×5 matrix.

Specifically, concerning pixel information corresponding to (row, column)=(C, 3), image information (5×5 matrix) in the region (row, column)=(A, 1) to (row, column)=(E, 5) is extracted. For pixel information corresponding to (row, column)=(F, 8), image information (5×5 matrix) in the region (row, column)=(D, 6) to (row, column)=(H, 10) is extracted.

In step S502, for the extracted matrix image, it is determined whether or not there is an image in each matrix component. Then, it is determined whether each pixel information is "high" or "low" and thus data contents of the matrix image are recognized and image information for comparison is obtained accordingly.

In step S503, the image information for comparison (matrix image) is collated with reference images which are stored in advance. If there is found a reference image which matches the comparison image information, that reference image is determined as an image corresponding to the comparison image information in step S504.

For example, a reference image determined corresponding to a matrix image information (comparison image information) in the region (row, column)=(A, 1) to (E, 5) in FIG. 6 is the reference image c in FIG. 3 having the periodic line pattern. Similarly, for the pixel at (row, column)=(C, 8), the reference image a in FIG. 3 is identified as an image which matches the matrix image information (comparison image information) in the region (row, column)=(A, 6) to (E, 10).

If there is no reference image which matches image information for comparison, in step S505, a reference image which is most similar to the comparison image information is selected and the selected reference image is determined as the one corresponding to the comparison image information.

For example, there is no reference image which matches the matrix image information (comparison image information) in the region (row, column)=(A, 2) to (E, 6) in FIG. 6. Then, the similar reference image c in FIG. 3 is determined as the one corresponding to the comparison image information.

In step S506, from the data stored in exposure energy density storage unit 209, an exposure energy density corresponding to the noticed pixel information is called. Specifically, an exposure energy density to be applied to the central dot of a reference image is preliminarily determined by an experiment or the like and determined values are stored in exposure energy density storage unit 209 as the LUT. Accordingly, the exposure energy density to be applied to the dot position corresponding to the noticed pixel information is called from exposure energy density storage unit 209 based on the reference image which is identified as the one corresponding to the pixel information.

In step S507, the called exposure energy density for the dot position corresponding to the noticed pixel information is temporaliy stored. In step S508, it is determined whether or not exposure energy density is determined for all pieces of pixel information (dots) in the input image information.

If exposure energy density has been determined for all pieces of pixel information, step S509 is conducted in which information regarding the determined density is output to driver 205. If exposure energy density has not been determined for all pieces of pixel information, this flow returns to step S501 and the process steps (step S501 to step S508) are repeated until determination of the exposure energy density is completed for all pixels.

In this way, optimum exposure energy densities can be determined that are to be applied to print positions corresponding to all pixels in the input image information.

FIG. 7 shows exposure energy densities to be applied to respective dot positions for the digital image information shown in FIG. 6, the densities being determined by control unit 107 following the above processing. It is noted that the determined exposure energy densities shown here are for only the region (row, column)=(A, 1) to (E, 20). If a noticed pixel information corresponds to a white portion, the exposure energy density is zero.

Following the processing described above, an exposure energy density is determined that is to be applied to a dot position corresponding to each pixel in input image information, and the exposure energy density is controlled based on result of the determination. Then, even if the resolution is high, difference in the dot density does not cause difference in the image reproducibility, and thus an excellent image reproducibility can be ensured for various images.

Second Embodiment

Figure 8:
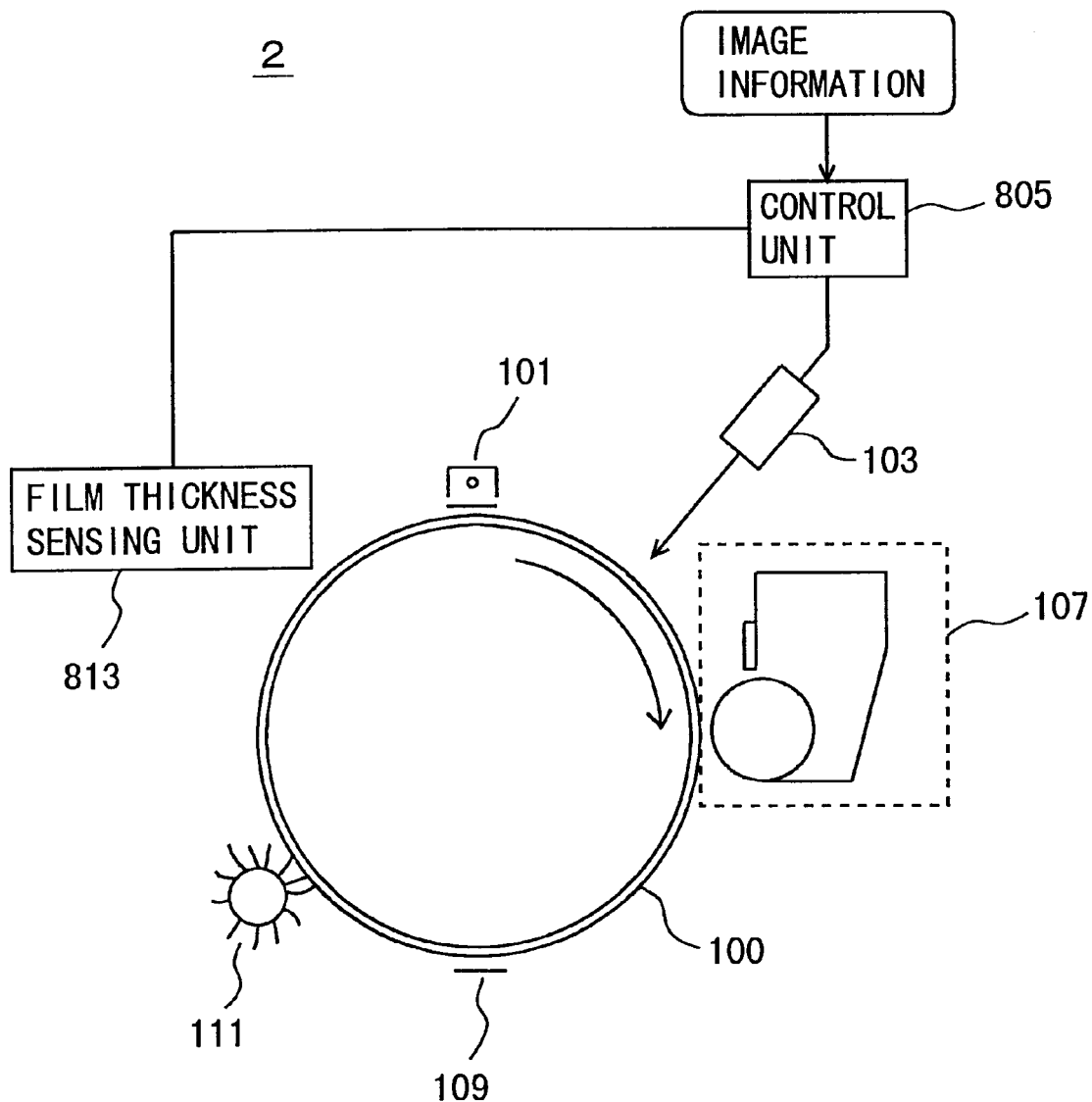
FIG. 8 illustrates a basic structure of an image forming apparatus according to another embodiment of the invention.

The second embodiment of the present invention is now described. FIG. 8 shows a basic structure of an image forming apparatus 2 according to one of the embodiments of the present invention. Referring to FIG. 8, image forming apparatus 2 includes, similarly to image forming apparatus 1, a photoreceptor drum 100, a reset unit 111, a charging unit 101, an exposure unit 103, a control unit 805, a development unit 107, a transfer unit 109 and a fixing unit (not shown), and additionally includes a film thickness sensing unit 813 measuring the film thickness of photoreceptor drum 100.

Film thickness sensing unit 813 here uses a method of directly detecting the film thickness by light, ultrasonic wave, or the like. The sensing method is not limited thereto. For example, change of the film thickness may be predicted indirectly based on such information as the total number of times image forming apparatus 2 is driven, driving time thereof, the total number of times photoreceptor drum 100 is rotated, and the like. If this indirect sensing method is employed, there is no need to newly provide an ultrasonic device or the like. Then, simplification of the structure as well as an advantage in cost to prevent increase of cost are achieved.

The process of forming an image by image forming apparatus 2 is similar to that of image forming apparatus 1 and description thereof is not repeated here.

Figure 9:
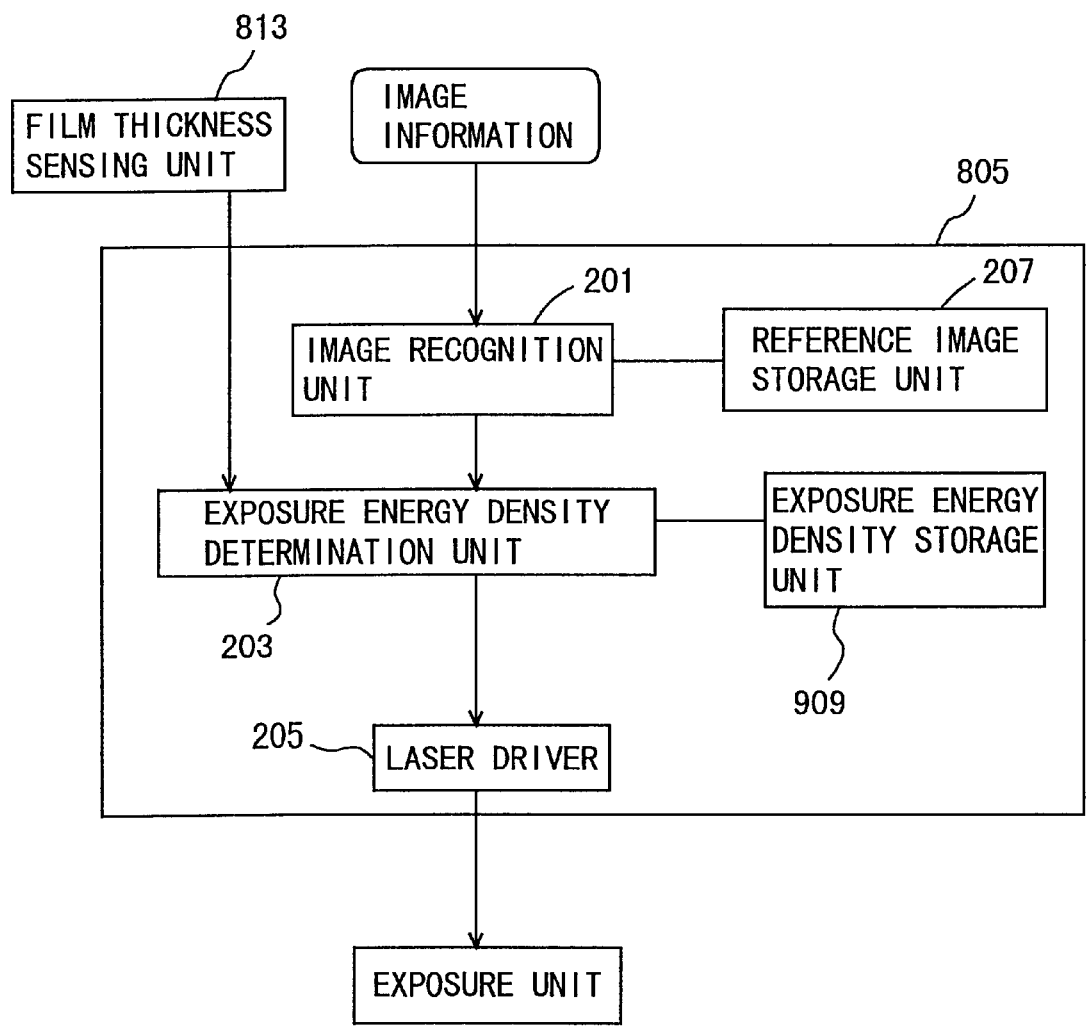
FIG. 9 is a functional block diagram of a control unit of the image forming apparatus.

FIG. 9 is a functional block diagram showing a structure of control unit 805 of image forming apparatus 2. Referring to FIG. 9, control unit 805 basically has the same structure as that of control unit 105 of image forming apparatus 1.

A difference is that an exposure energy density determination unit 203 determines exposure energy density considering additionally the film thickness sensed by film thickness sensing unit 813 in FIG. 8.

Further, an exposure energy density storage unit 909 stores exposure energy density for a reference image associated with the film thickness of the photoreceptor, which is not just the exposure energy density for a reference image. Therefore, exposure energy densities are stored in the form of a table LUT for each film thickness of the photoreceptor. It is noted that the stored exposure energy density may be a function of the film thickness of the photoreceptor.

Figure 10:
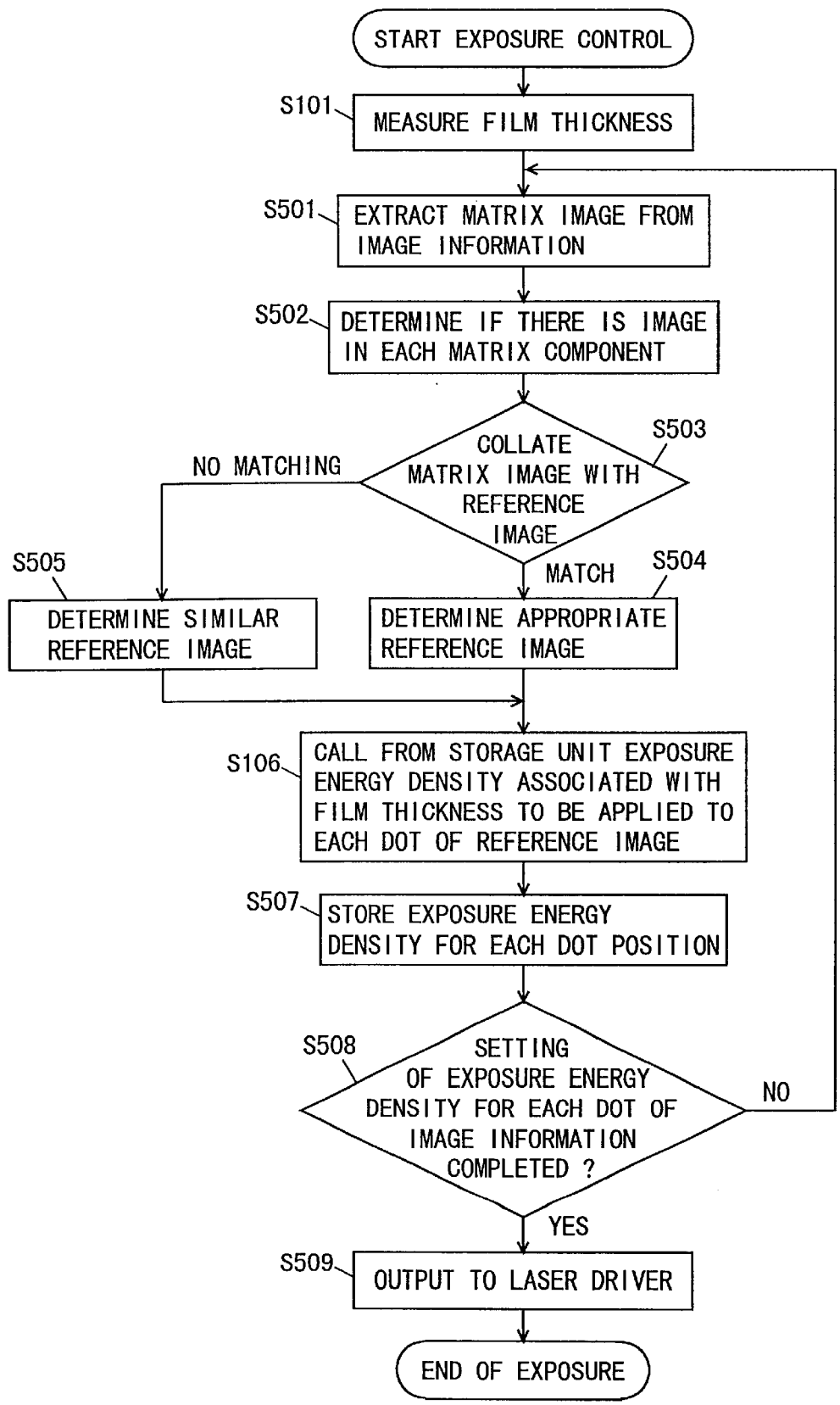
FIG. 10 is a flowchart illustrating a flow of controlling exposure energy density by the control unit of the image forming apparatus.

FIG. 10 is a flowchart illustrating a flow of controlling the exposure energy density by control unit 805 of image forming apparatus 2. Referring to FIG. 10, in step S101, control unit 805 obtains information on the film thickness of photoreceptor drum 100 from film thickness sensing unit 813.

Subsequent processing steps (from step S501 to step S509) are identical to those in FIG. 5 of image forming apparatus 1 except for processing in step S106.

In step S106, as an exposure energy density for a determined reference image, a value is read from exposure energy density storage unit 909 in consideration of the information on the film thickness of photoreceptor drum 100 that is obtained in step S101.

Following this processing, an exposure energy density to be applied to each pixel is determined considering the film thickness of the photoreceptor. Therefore, even if the film thickness of the photoreceptor decreases due to wear as time passes, a superior image reproducibility can be achieved for input image information with various dot densities.

When there is no reference image which matches an image for comparison, image forming apparatuses 1 and 2 select one reference image which resembles the comparison image. Alternatively, several reference images close to the comparison image may be selected to calculate an optimum energy density based on these reference images. In the flowcharts shown in FIGS. 5 and 10 for controlling exposure energy density, exposure energy densities to be applied to respective dot positions corresponding to all pieces of pixel information in the input image information are temporarily stored (step S507) and then output to driver 205. Alternatively, each time a predetermined number of densities are determined, or each time a density for one dot is determined, the determined densities (density) may be output to driver 205, for example. In this case, the memory capacitance required for storing exposure energy densities in step S507 can be reduced.

Although a matrix size of 5×5 as shown in FIG. 3 is herein employed for the reference image, the size is not limited thereto and may be smaller or greater. In addition, the reference images are not limited to those five patterns shown in FIG. 3. If the number of reference images is increased, exposure energy density can more accurately be determined and thus the image reproducibility is enhanced.

Further, the basic process steps of the electrophotography system illustrated for image forming apparatuses 1 and 2 are not limited to those in the embodiments of the present invention. For example, development unit 107 may employ not only the one-component development but other development methods such as two-component development and jumping development.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   an exposure unit for exposing a photoreceptor charged to a predetermined potential to light;
   a controller controlling exposure energy density of said exposure unit based on image information; and
   a development unit for visualizing an electrostatic latent image formed on said photoreceptor by said exposure unit; wherein said controller includes:
   a first memory storing a plurality of reference images;
      a second memory storing an exposure energy density corresponding to each of said reference images;
      a comparison unit for comparing said image information with a reference image; wherein said comparison unit includes:
      an extraction unit for extracting from said image information a matrix image constituted of predetermined units for each pixel information, and
      a decision unit for deciding if said extracted matrix image matches any of said reference images; and
      a first determination unit based on result of the comparison by said comparison unit for determining an exposure energy density corresponding to each of a plurality of pieces of pixel information constituting said image information, wherein said first determination unit includes:
         a second determination unit based on result of the comparison by said comparison unit for determining an appropriate one of said plurality of reference images for each of said plurality of pieces of said pixel information,
         said second determination unit includes a first recognition unit for recognizing, if said decision unit decides that said extracted matrix image matches a reference image, the reference image as said appropriate reference image and a second recognition unit for recognizing, if said decision unit decides that said extracted matrix image does not match any of said reference images, a reference image similar to said extracted matrix image as said appropriate reference image and
         the exposure energy density corresponding to each of said plurality of pieces of pixel information is determined based on said determined reference image and said stored exposure energy density.

2. The image forming apparatus according to claim 1, further comprising a film thickness sensing unit for sensing film thickness of said photoreceptor, wherein
   said second memory stores the exposure energy density in association with the film thickness of said photoreceptor, the exposure energy density corresponding to each of said reference images, and
   said first determination unit determines the exposure energy density corresponding to each piece of said pixel information based on said determined reference image and said exposure energy density stored in association with the film thickness of said photoreceptor.

3. The image forming apparatus according to claim 2, wherein the film thickness sensing unit detects film thickness by light waves.

4. The image forming apparatus according to claim 2, wherein the film thickness sensing unit detects film thickness by ultrasonic waves.

5. A method of forming an image, the method comprising the steps of
   exposing a photoreceptor charged to a predetermined potential to light;
   controlling exposure energy density of an exposure unit based on image information; and
   developing an electrostatic latent image formed on said photoreceptor in said exposing step to visualize the latent image, wherein
      said controlling step includes:
         a first storage step of storing a plurality of reference images;
         a second storage step of storing an exposure energy density corresponding to each of said reference images;
         extracting from said image information a matrix image constituted of predetermined pixel units for each pixel information;

deciding if said extracted matrix image matches any of said reference images;

a first determination step of determining an appropriate one of said reference images for each of a plurality of pieces of pixel information constituting said image information based on result of the decision in said deciding step; and said first determination step including a first recognition step of recognizing, if it is decided in said deciding step that said extracted matrix image matches a reference image, the reference image as said appropriate reference image, and a second recognition step of recognizing, if it is decided in said deciding step that said extracted matrix image does not match any of said reference images, a reference image similar to said extracted matrix image as said appropriate reference image; and a second determination step of determining an exposure energy density corresponding to each piece of said pixel information based on said determined reference image and said stored exposure energy density.

6. The image forming method according to claim 5, further comprising the step of sensing film thickness of said photoreceptor, wherein in said first storage step, the exposure energy density corresponding to each of said reference images is stored in association with the film thickness of said photoreceptor, and in said second determination step, the exposure energy density corresponding to each piece of said pixel information is determined based on said determined reference image and said exposure energy density stored in association with the film thickness of said photoreceptor.

7. The image forming method according to claim 6, wherein the step of sensing film thickness of the photoreceptor includes sensing film thickness using light waves.

8. The image forming method according to claim 6, wherein the step of sensing film thickness of the photoreceptor includes sensing film thickness using ultrasonic waves.

* * * * *